Patented Dec. 11, 1928.

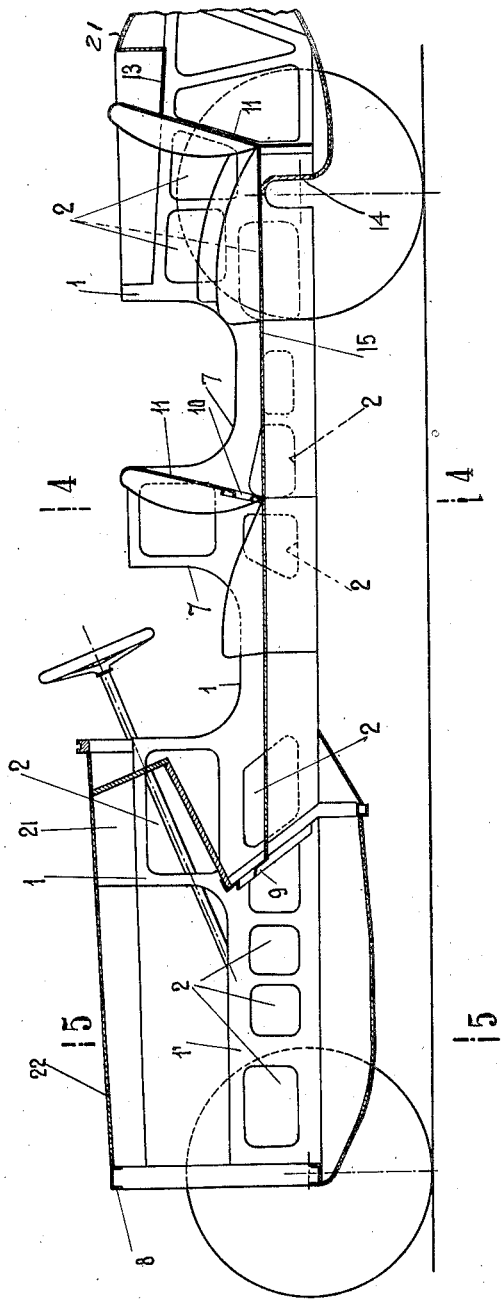

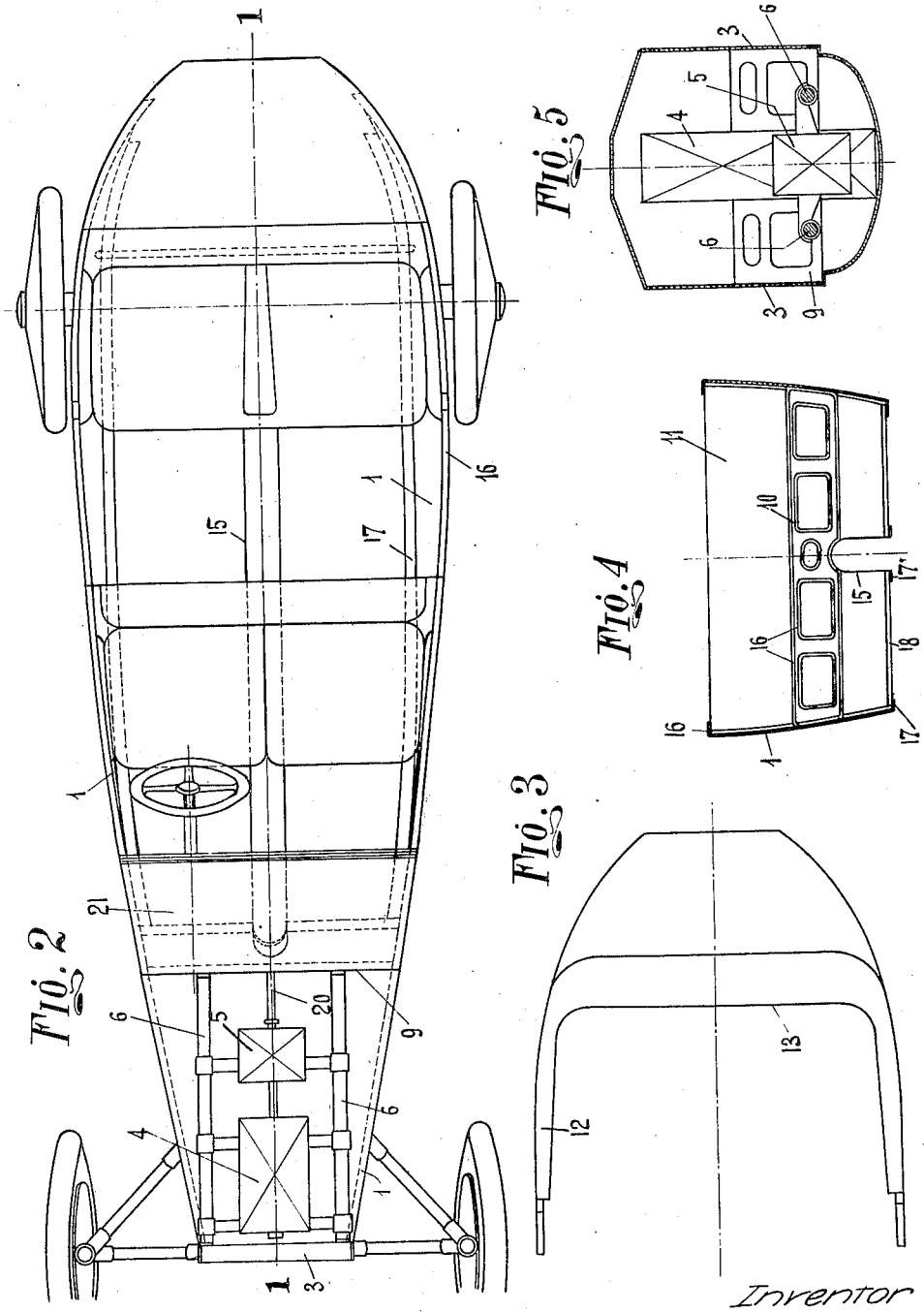

1,694,546

UNITED STATES PATENT OFFICE.

VINCENZO LANCIA, OF TURIN, ITALY.

MOTOR CAR.

Application filed May 10, 1923, Serial No. 638,058, and in Italy June 28, 1922.

The present invention relates to motor cars and particularly to that type of cars in which the wheel axles are connected with a structure providing at the same time the car frame and the body skeleton, and has for its object a car in which the body skeleton consists of two side structures made of sheet metal and interconnected by transverse members, the engine and other gears as well as the suspension or springing means being mounted on or connected with said side structures.

On the annexed drawing is shown by way of example an embodiment of the present invention and Figure 1 is a central longitudinal section of the car on line 1—1 of Fig. 2 with the engine and other gears removed for sake of clearness; Figure 2 is a plan view of a car with the engine bonnet removed; Figure 3 is a fragmentary detail view of the rear portion of the car shown in Figure 1 and having a case for the hood; Figure 4 is a transverse section on line 4—4 of Figure 1; Figure 5 is a transverse section on line 5—5 of Figure 1.

As shown on the drawing the car comprises two side structures 1 made of sheet metal, which are apertured as shown at 2 for the purpose of lightness, and are cambered to provide the desired shape both in plan and in transverse sections.

Each structure 1 extends along the entire length of the car and has a portion 1' of reduced height at its front end for leaving a free space around the engine and other gears of the car, the engine 4 and the change speed gear 5 being shown diagrammatically in Figure 2 and being supported by longitudinal bars 6 fastened to the structures and to a transverse member 9 hereinafter described.

The side structures 1 have a larger height at their rear portion wherein they show large upper cuts 7 for reception of the side doors of the body.

The two side structures 1 are interconnected at their front end by a frame 8 in which is located the radiator 3, by a transverse member 9 providing a portion of the footboard and a support for the bars 6, and by another transverse member 10 in register with the back of front seat of the car.

The assembling of the side structures is completed by two metal plates 11 providing the supports for the seat backs and fastened along their edges to said side structures as shown by Figure 4.

In a similar manner other members arranged for other purposes transversely to the car may be availed of for improving the assembly of the side structures 1; by way of example, as shown by Figure 3, advantage may be taken of a hood case comprising side portions 12 fastened to the side structures 1 and a transverse portion 13 interconnecting said structures.

The side structures 1 are further connected in the rear portion of the car by a channel 14 made of sheet metal and extending transverse to the car axis, this channel providing a space for the rear axle while a similar longitudinal channel 15 extends from the front portion of the vehicle to the rear one for giving passage to the driving shaft 20 leading from the change speed gear 5 to the said rear axle.

The radiator frame 8, the transverse members 9 and 10, back plates 11, channel 14, hood case 12—13 provide means interconnecting the side structures 1 and make with these structures a rigid construction providing at the same time the body skeleton and the car frame and carrying the engine, the transmission gears and the spring or suspension means.

The metal plates providing the side structures are flanged as at 16 along their edges and the edges of the apertures 2, said flanges 16 improving their stiffness; along the lower edge of said structures and of the channel 15 are further provided flanges or section irons 17—17' respectively, on which bear the boards 18 providing the footboard of the vehicle.

This footboard may thus be located at a level very near the ground and under the level of the wheel axes, because the driving shaft and the rear axle are located within the channels 15 and 14 extending upwardly with respect to said footboard.

On the structures 1 are further fastened the metal plates as 21 providing the deck or outer surface or sheet of the body, the engine bonnet 12, and so on.

The described construction shows the advantage that the usual frame for the car and the wooden skeleton for the body may be omitted, the structure obtained according to the present invention being lighter and less expensive than known ones, and having the requisite strength.

It is to be understood that the present invention may be used in connection with motor cars and vehicles of any kind and shape, and with any desired kind and shape of bodies, the invention being in no way restricted to the described embodiment but comprising all the constructions lying within the spirit of the appended claims.

What I claim as my invention and desire to secure by United States Letters Patent is:—

1. Motor car structure comprising two sides of sheet metal extending from end to end of the final structure with flanges along their lower edges in their middle portion, said sides being connected together by transverse members including a radiator frame, seat back supports and a transverse channel member providing space for the car rear axle, and a longitudinal channel member providing passage for a shaft connecting the car engine and rear axle, the edges of said longitudinal channel member forming projecting flanges cooperating with said flanges of said sides for supporting footboards.

2. Motor car structure comprising two sides of sheet metal extending from end to end of the final structure and connected together by transverse members including a radiator frame, seat back supports, a transverse channel member providing space for the car rear axle, and a sheet metal case for a hood, said case having a U-shaped section and comprising at each end of its transverse portion a leg secured to the adjacent sheet metal side of the structure.

In testimony whereof, I have signed my name to this specification.

VINCENZO LANCIA.